(12) United States Patent
Sakashita et al.

(10) Patent No.: US 10,821,804 B2
(45) Date of Patent: Nov. 3, 2020

(54) VEHICLE AIR-CONDITIONER—UNIT ATTACHMENT—PART STRUCTURE

(71) Applicant: HONDA MOTOR CO., LTD., Tokyo (JP)

(72) Inventors: Shoji Sakashita, Saitama (JP); Toshikatsu Mouri, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 15/840,074

(22) Filed: Dec. 13, 2017

(65) Prior Publication Data

US 2018/0178623 A1    Jun. 28, 2018

(30) Foreign Application Priority Data

Dec. 27, 2016   (JP) .................................. 2016-252356

(51) Int. Cl.
*B60H 1/00*   (2006.01)
*B62D 25/14*  (2006.01)
*B60R 16/023* (2006.01)
*B60H 1/22*   (2006.01)

(52) U.S. Cl.
CPC ........ *B60H 1/00535* (2013.01); *B60H 1/0055* (2013.01); *B60R 16/0239* (2013.01); *B62D 25/142* (2013.01); *B60H 1/2215* (2013.01); *B60H 2001/2287* (2013.01)

(58) Field of Classification Search
CPC ............... B60H 1/2215; B60H 1/0055; B60H 1/00535; B60H 1/00542; B60H 1/00528; B60H 1/00521; B60H 1/00514; B60H 2001/2287; B62D 25/142; B60R 16/0239
See application file for complete search history.

(56) References Cited

U.S. PATENT DOCUMENTS

| 4,767,153 A * | 8/1988 | Kawasaki .......... B60H 1/00535 180/90 |
| 2012/0057972 A1 | 3/2012 | Kim et al. |
| 2016/0318375 A1 * | 11/2016 | Kamiyama ........... F24H 9/2028 |

FOREIGN PATENT DOCUMENTS

| DE | 4336105 A1 * | 4/1995 | ......... B60H 1/00535 |
| JP | 2000-355210  | 12/2000 | |
| JP | 2001-260634  | 9/2001  | |
| JP | 2007-131136  | 5/2007  | |

(Continued)

OTHER PUBLICATIONS

Japanese Notice of Allowance for Japanese Patent Application No. 2016-252356 dated Oct. 1, 2019.

*Primary Examiner* — Steven S Anderson, II
(74) *Attorney, Agent, or Firm* — Amin, Turocy & Watson, LLP

(57) ABSTRACT

In a vehicle air-conditioner-unit attachment-part structure, an air conditioner unit is arranged to face a rear surface of a dashboard and on an occupant room side. An air conditioner unit-side fixation part that is provided on a unit case is attached to a vehicle body-side fixed part at a more vehicle rearward position than the dashboard. A displacement acceptance part that accepts a movement to a vehicle rearward direction of the unit case with respect to the vehicle body-side fixed part is provided between the air conditioner unit-side fixation part and the vehicle body-side fixed part when an impact load is input to the unit case via the dashboard from a vehicle frontward direction.

8 Claims, 5 Drawing Sheets

(56) References Cited

FOREIGN PATENT DOCUMENTS

| JP | 2013224771 | * | 10/2013 |
| JP | 2015023646 | * | 2/2015 |
| JP | 2015-140049 | | 8/2015 |
| KR | 2013094888 | * | 8/2013 |
| WO | 2013/108774 | | 7/2013 |

* cited by examiner

VEHICLE AIR-CONDITIONER—UNIT ATTACHMENT—PART STRUCTURE

CROSS-REFERENCE TO RELATED APPLICATION

Priority is claimed on Japanese Patent Application No. 2016-252356, filed on Dec. 27, 2016, the contents of which are incorporated herein by reference.

BACKGROUND

Field of the Invention

The present invention relates to a vehicle air-conditioner-unit attachment-part structure.

Background

In most of air conditioners provided on a vehicle, an air conditioner unit having a unit case that accommodates air conditioner components such as a blower used for blowing air and an evaporator is arranged on an occupant room side, and an external heat exchanger, a compressor, and the like that are connected to a refrigeration cycle component in the air conditioner unit are arranged in a power installation room (for example, an engine room) in front of the occupant room. The occupant room and the power installation room are partitioned by a dashboard. The external heat exchanger, the compressor, and the like are arranged on a frontward side of the dashboard.

In a vehicle on which an air conditioner is provided in this way, a technique has been proposed which can protect an auxiliary machine such as the compressor in the power installation room when an impact load is input from a vehicle frontward direction (for example, refer to Japanese Patent Application, Publication No. 2015-140049).

SUMMARY

In the technique described in Japanese Patent Application, Publication No. 2015-140049, although it is possible to protect the auxiliary machine in the power installation room when an impact load is input from a vehicle frontward direction, when the impact load that is input to the vehicle is large, there is a possibility in that the dashboard is subject to the impact load and is displaced to the occupant room side. Then, when the dashboard is subject to the impact load and is displaced to the occupant room side, there is a possibility in that the impact load is input to the unit case of the air conditioner unit that is fixed to a vehicle body at the rearward side of the dashboard.

A high-voltage electric component such as a PTC (Positive Temperature Coefficient) heater as an air conditioner component may be accommodated in the unit case of the air conditioner unit. When a large impact load is input from the frontward direction via the dashboard to such a unit case in which the high-voltage electric component is accommodated, the unit case itself is deformed, and there is a possibility in that a large load acts on the high-voltage electric component that is accommodated inside the unit case.

An object of an aspect of the present invention is to provide a vehicle air-conditioner-unit attachment-part structure that can effectively protect a high-voltage electric component that is accommodated in a unit case even when a large impact load is input from a vehicle frontward direction.

A vehicle air-conditioner-unit attachment-part structure according to an aspect of the present invention is an attachment part structure of an air conditioner unit of a vehicle, in which: an air conditioner unit includes a plurality of air conditioner components that includes a high-voltage electric component and a unit case that accommodates the plurality of air conditioner components; an occupant room of a vehicle and a power installation room in front of the occupant room are partitioned by a dashboard; the air conditioner unit is arranged to face a rear surface of the dashboard and on the occupant room side; and an air conditioner unit-side fixation part that is provided on the unit case is attached to a vehicle body-side fixed part at a more vehicle rearward position than the dashboard, wherein a displacement acceptance part that accepts a movement to a vehicle rearward direction of the unit case with respect to the vehicle body-side fixed part is provided between the air conditioner unit-side fixation part and the vehicle body-side fixed part when an impact load is input to the unit case via the dashboard from a vehicle frontward direction.

According to the above configuration, when an impact load is input to the unit case via the dashboard from the vehicle frontward direction, a movement to a vehicle rearward direction of the unit case is accepted by the displacement acceptance part that is provided between the air conditioner unit-side fixation part and the vehicle body-side fixed part, and the unit case is moved together with the dashboard to the vehicle rearward direction. Therefore, a large deformation load does not act on the unit case, and a large load does not easily act on the high-voltage electric component that is accommodated in the unit case.

One of the air conditioner unit-side fixation part and the vehicle body-side fixed part may have a slit substantially along a vehicle front-to-rear direction, another of the air conditioner unit-side fixation part and the vehicle body-side fixed part may have a shaft portion that extends in a direction which is substantially orthogonal to an extension direction of the slit and that is inserted in the slit, the shaft portion may be fastened and fixed to an edge portion of the slit in a state where the shaft portion is inserted in the slit, and the shaft portion and the slit may constitute the displacement acceptance part.

In this case, when an impact load is input to the unit case via the dashboard from the vehicle frontward direction, the shaft portion is relatively displaced in the slit, and the displacement to the vehicle rearward direction of the unit case is accepted. When employing this configuration, the unit case is moved to the vehicle rearward direction such that the shaft portion is guided by the slit when an impact load is input to the unit case, and therefore, the backward-moving behavior of the unit case can be made stable. Further, in this case, it becomes possible to constitute the displacement acceptance part by a simple configuration.

A front part of the unit case may be fixed to the dashboard.

In this case, the unit case is fixed also to the dashboard, and therefore, it becomes possible to stably support the unit case by the vehicle body without increasing the number of arrangement positions of the displacement acceptance part.

A front part of the unit case may be butted and fixed to a rear surface of the dashboard, the air conditioner unit-side fixation part may have a slit substantially along a vehicle front-to-rear direction and that opens in a vehicle frontward direction, the vehicle body-side fixed part may have a shaft portion that extends in a direction which is substantially orthogonal to an extension direction of the slit and that is inserted in the slit, the shaft portion may be fastened and fixed to an edge portion of the slit in a state where the shaft portion is inserted in the slit, and the shaft portion and the slit may constitute the displacement acceptance part.

In this case, when the air conditioner unit is attached to the vehicle body, by moving the entire unit case to the vehicle frontward direction at the occupant room side, it is possible to insert the shaft portion on the vehicle body side to the slit of the unit case via an opening of the slit, and the front part of the unit case can be butted to the rear surface of the dashboard. Further, in this state, by fastening and fixing the shaft portion to the edge portion of the slit, and by fixing the front part of the unit case to the rear surface of the dashboard, it is possible to easily attach the air conditioner unit to the vehicle body.

The air conditioner unit may have an electric cable that extends outside, the electric cable may be latched and fixed to the unit case and be latched and fixed to a vehicle body at a position apart from the unit case, and the electric cable that is latched and fixed to the unit case and the vehicle body may have a curved or bent extra length part between a latch fixation part with respect to the unit case and a latch fixation part with respect to a vehicle body.

In this case, when an impact load is input to the unit case via the dashboard from the vehicle frontward direction, the unit case is displaced together with the dashboard to the vehicle rearward direction, and the latch fixation part with respect to the unit case of the electric cable is also displaced to the vehicle rearward direction in accordance with the displacement of the unit case. At this time, although the latch fixation part with respect to the unit case of the electric cable is relatively displaced with respect to the latch fixation part with respect to the vehicle body, the curved or bent extra length part is provided between the latch fixation parts, and therefore, a large load does not easily act on the latch fixation part with respect to the vehicle body abruptly. Accordingly, when this configuration is employed, it is also possible to effectively protect the electric cable.

According to an aspect of the present invention, when an impact load is input to the unit case via the dashboard from the vehicle frontward direction, a movement to the vehicle rearward direction of the unit case is accepted by the displacement acceptance part, the unit case is moved together with the dashboard to the vehicle rearward direction, and a large deformation load does not act on the unit case. Therefore, it is possible to effectively protect the high-voltage electric component that is accommodated in the unit case.

DESCRIPTION OF THE EMBODIMENTS

Figure 1:
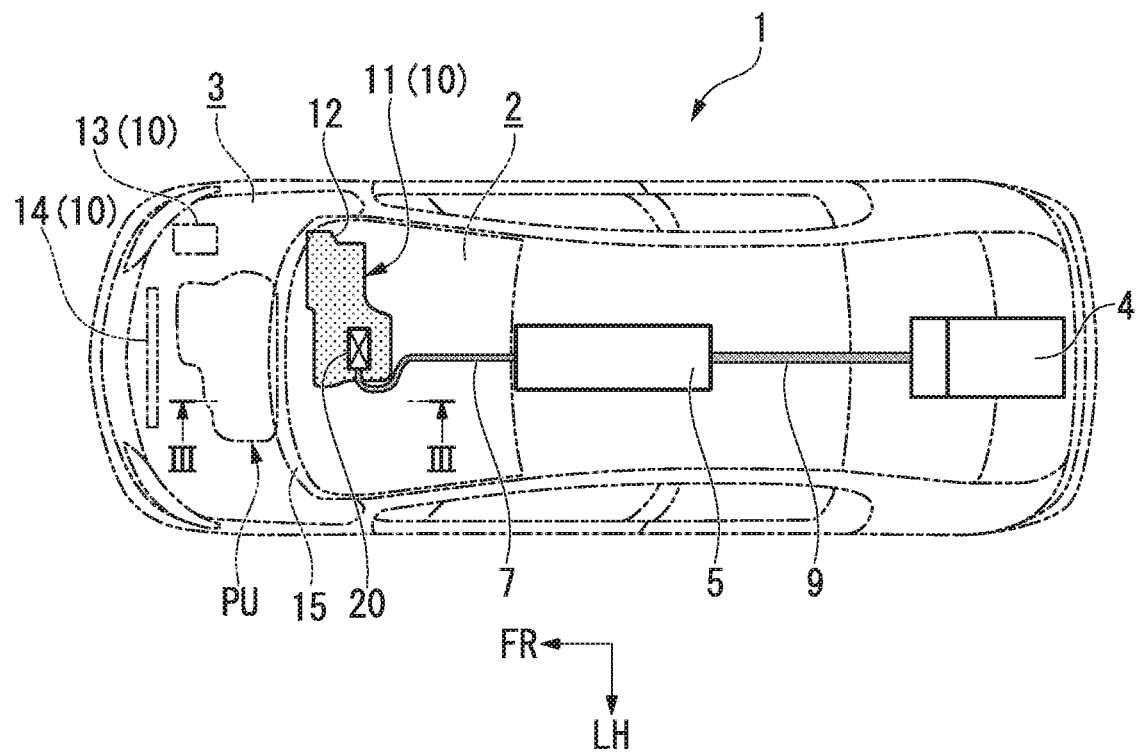
FIG. 1 is a plan view schematically showing an arrangement of an air conditioner of a vehicle according to an embodiment of the present invention.

Hereinafter, an embodiment of the present invention will be described with reference to the drawings. In the drawings, an arrow FR that indicates a vehicle frontward direction, an arrow UP that indicates a vehicle upward direction, and an arrow LH that indicates a vehicle left side direction are shown.

Figure 2:
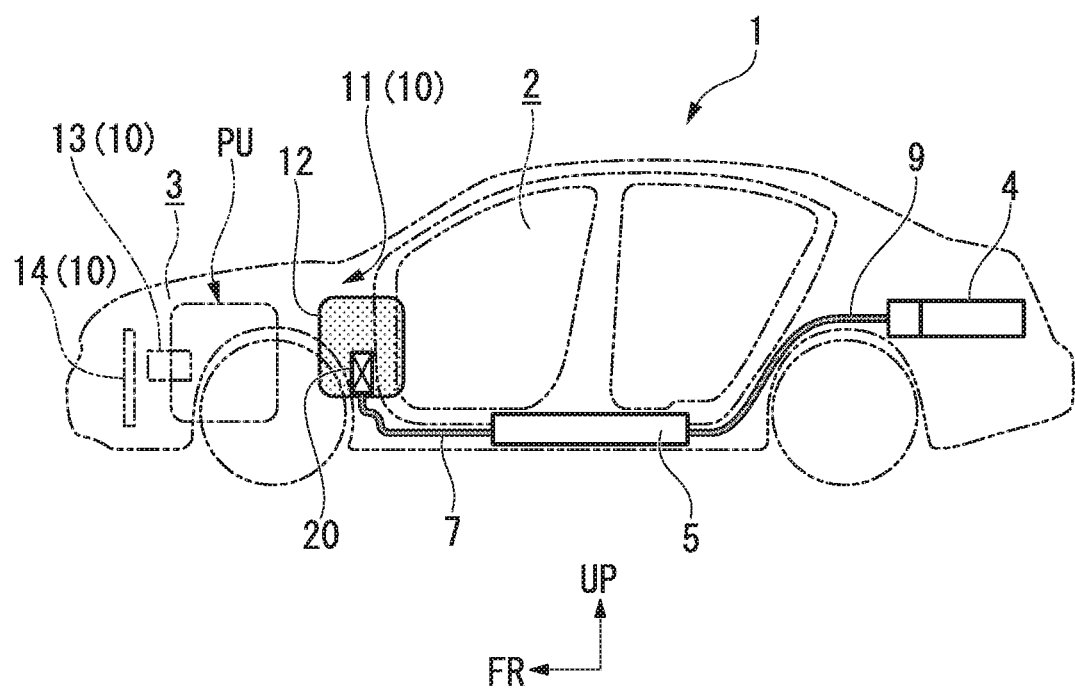
FIG. 2 is a side view schematically showing the arrangement of the air conditioner of the vehicle according to the embodiment of the present invention.

FIG. 1 is a plan view schematically showing an arrangement of an air conditioner 10 of a vehicle 1 according to the present embodiment. FIG. 2 is a side view schematically showing the arrangement of the air conditioner 10 of the vehicle 1 according to the present embodiment.

In the vehicle 1 according to the present embodiment, an occupant room 2 in which an occupant boards is provided at a substantially middle part in a vehicle front-to-rear direction. In the vehicle 1, a power installation room 3 in which a power unit PU used for driving the vehicle such as an engine and a motor is provided is provided in front of the occupant room 2.

A high-voltage battery 4 is provided at a more rearward position than the occupant room 2 of the vehicle 1. A power conversion block 5 that includes a DC-DC converter and a PDU (Power Drive Unit) is arranged below the occupant room 2. The power conversion block 5 is connected to the high-voltage battery 4 via an electric cable 9. The DC-DC converter converts a high-voltage DC power of the high-voltage battery 4 into a low-voltage DC power. The PDU performs conversion of electric power between three-phase AC power used by a power unit PU and DC power on the high-voltage battery 4 side. The power conversion block 5 is connected to a motor part of the power unit PU via a three-phase AC electric cable 6 (refer to FIG. 3). The power conversion block 5 is connected to an air conditioner unit 11 of the air conditioner 10 via a high-voltage DC electric cable 7.

The air conditioner 10 includes: the air conditioner unit 11 that is formed of air conditioner components such as a blower used for blowing air, an evaporator, an internal heat exchanger used for heating, and a motor used for passage switching, which are accommodated in a unit case 12; a compressor 13 that is connected by piping to the evaporator and the internal heat exchanger of the air conditioner unit 11; and an external heat exchanger 14. The air conditioner unit 11 is arranged at a front lower position of an instrument panel (not shown) of a front part in the occupant room 2. The compressor 13 and the external heat exchanger 14 are arranged in the power installation room 3 in front of the occupant room 2.

Further, a PTC (Positive Temperature Coefficient) heater 20, which is a high-voltage electric component, as one of the air conditioner components is accommodated in the unit case 12 of the air conditioner 10. The PTC heater 20 is arranged in an air passage in the air conditioner unit 11. The PTC heater 20 heats air for air conditioning that passes in the air passage by heating using electric power. It is possible to use the PTC heater 20 as an aid to heating by the internal heat exchanger used for heating at a chilly or cold time, or it is possible to use the PTC heater 20 alone.

Figure 3:
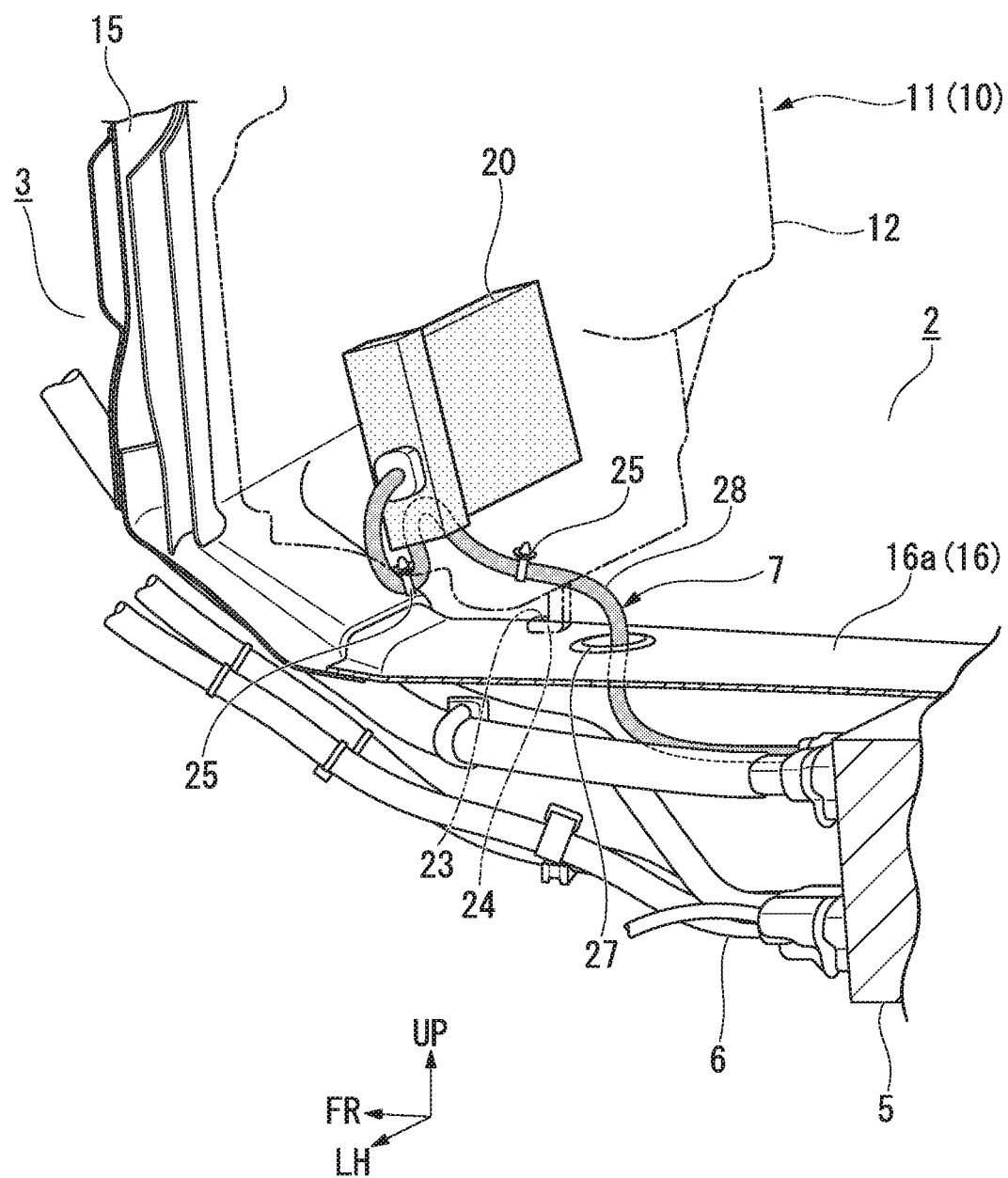
FIG. 3 is a partial cross-sectional perspective view of a cross-section along a III-III line of FIG. 1 of part of the vehicle according to the embodiment of the present invention.
Figure 4:
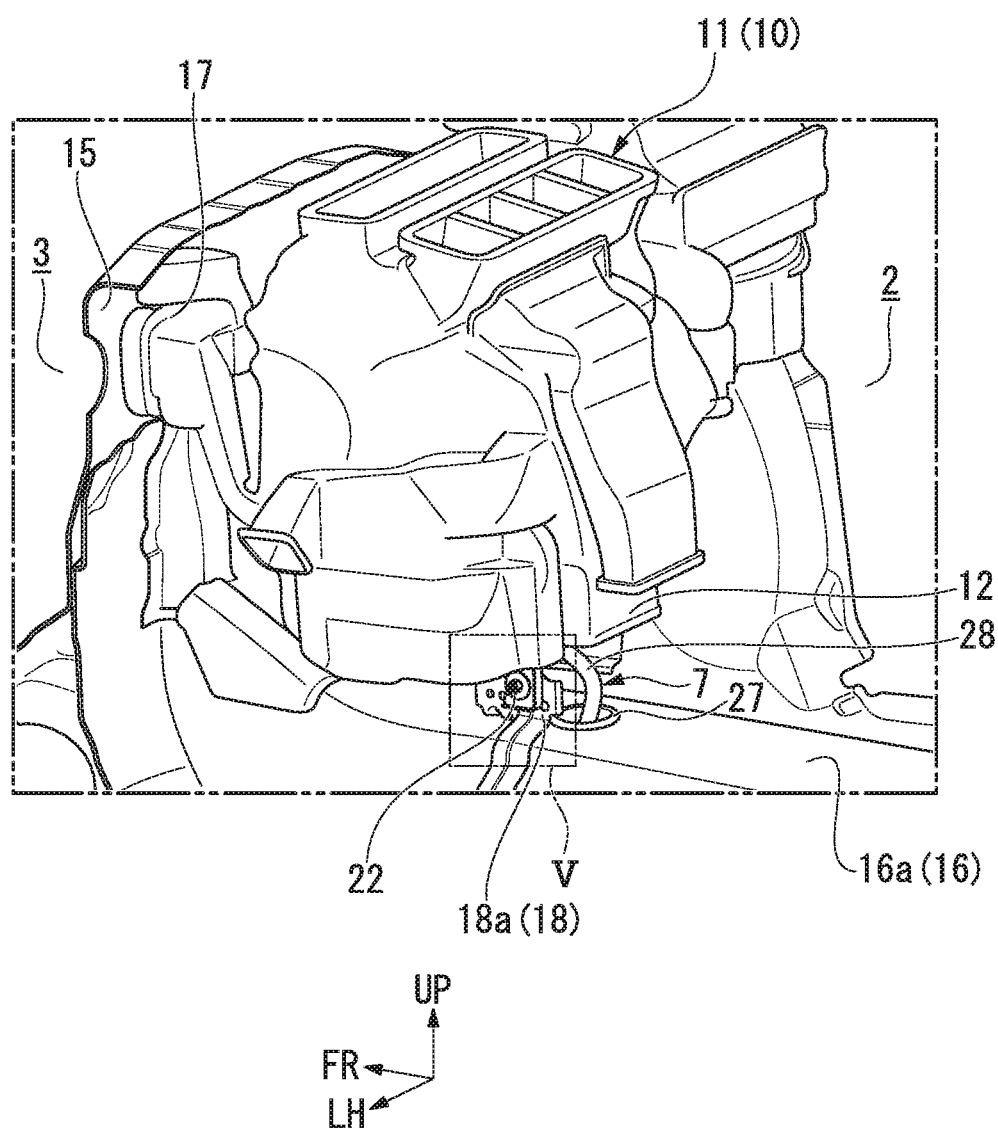
FIG. 4 is a perspective view showing the arrangement of an air conditioner unit of the vehicle according to the embodiment of the present invention.
Figure 5:
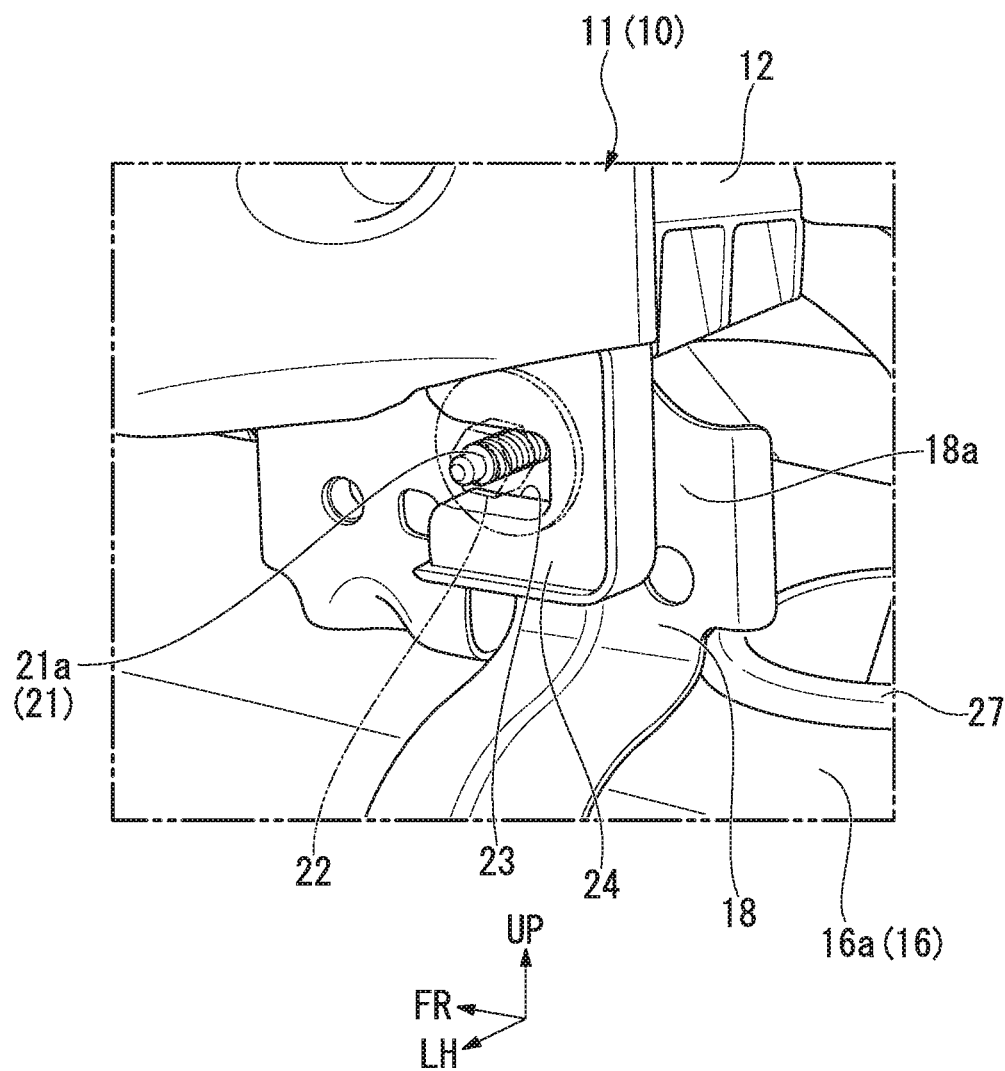
FIG. 5 is an enlarged perspective view showing a V part of FIG. 4 of the vehicle according to the embodiment of the present invention.

FIG. 3 is a view of a cross-section along a line of FIG. 1 of part of the vehicle 1, in which a front part of the occupant room 2 is seen from the left, rear, and diagonally upper position. In FIG. 3, part of the air conditioner unit 11 is omitted, and the unit case 12 is indicated by an imaginary line. FIG. 4 is a view of a cross-section of part of the vehicle 1, in which a front part of the occupant room 2 is seen from the left, rear, and diagonally upper position. FIG. 5 is an enlarged view showing a V part of FIG. 4.

As shown in FIG. 3 and FIG. 4, the occupant room 2 and the power installation room 3 are partitioned by a dashboard 15. The dashboard 15 is mainly formed of a panel material made of a metal. Each of right and left side edge parts of the dashboard 15 is joined to a frame member of a vehicle body side part. A lower edge part of the dashboard 15 is joined to a floor panel 16 below the occupant room 2.

In the case of the present embodiment, the air conditioner unit 11 is arranged to face a rear surface of the dashboard 15 at a part close to the right side of a front part of the occupant room 2. As shown in FIG. 4, an attachment bracket 17 is provided to extend on a front end part of the unit case 12 of the air conditioner unit 11. The attachment bracket 17 is fixed, by bolt fastening and the like, to the dashboard 15. A plurality of attachment brackets 17 are arranged on a front end part of the unit case 12 along a vehicle width direction.

A support bracket 18 used for fixing a rear lower end close to an inner side in the vehicle width direction of the unit case 12 is fixed, by welding and the like, to an upper surface of a tunnel part 16a at a substantially middle part in the vehicle width direction of the floor panel 16 in the occupant room 2. The support bracket 18 has a vertical stand wall 18a that stands upward in the vertical direction from the upper surface of the tunnel part 16a along the vehicle front-to-rear direction. A stud bolt 21 having a shaft portion 21a that extends along the vehicle width direction is attached to the vertical stand wall 18a. A nut 22 is screwed to the shaft portion 21a of the stud bolt 21 as shown in FIG. 5 in a state where the shaft portion 21a is engaged with a rear lower end of the unit case 12 as described below.

In the present embodiment, the support bracket 18 and the stud bolt 21 constitute a vehicle body-side fixed part. The support bracket 18 and the stud bolt 21 are arranged at a more vehicle rearward position than the dashboard 15.

As shown in FIG. 3 and FIG. 5, a latch block 24 having a slit 23 substantially along the vehicle front-to-rear direction is provided to extend on a rear lower end close to an inner side in the vehicle width direction of the unit case 12. The slit 23 of the latch block 24 opens in the vehicle frontward direction. The shaft portion 21a of the stud bolt 21 is inserted in the slit 23 of the latch block 24. The shaft portion 21a of the stud bolt 21 extends in a direction which is substantially orthogonal to an extension direction of the slit 23.

In the present embodiment, the latch block 24 constitutes an air conditioner unit-side fixation part.

The unit case 12 can be attached to a vehicle body, for example, as described below.

The unit case 12 is arranged above the floor panel 16 such that an opening of the slit 23 faces the shaft portion 21a from the vehicle rearward side, and in that state, the unit case 12 is moved frontward. Thereby, the shaft portion 21a of the stud bolt 21 is inserted in the slit 23 of the latch block 24 via an opening on the front end side, and the attachment bracket 17 at the front part of the unit case 12 is butted to the rear surface of the dashboard 15. In this state, the attachment bracket 17 at the front part of the unit case 12 is fastened and fixed to the dashboard 15, and the nut 22 is screwed to the shaft portion 21a of the stud bolt 21. When the nut 22 is screwed to the shaft portion 21a of the stud bolt 21, the shaft portion 21a is fastened and fixed to an edge portion of the slit 23 of the latch block 24.

Although in the air conditioner unit 11, the front part of the unit case 12 is fixed to the rear surface of the dashboard 15, and the rear lower end of the unit case 12 is fixed to the support bracket 18 of the floor panel 16, a space between the latch block 24 (air conditioner unit-side fixation part) of the unit case 12 and the support bracket 18 (vehicle body-side fixed part) on the vehicle body side accepts a movement to the vehicle rearward direction of the unit case 12 when an impact load that is equal to or more than a specified value is input to the unit case 12 via the dashboard 15 from a vehicle frontward direction. At this time, the shaft portion 21a of the stud bolt 21 is relatively slid in the slit 23 of the latch block 24.

In the present embodiment, the shaft portion 21a of the stud bolt 21 and the slit 23 of the latch block 24 constitute a displacement acceptance part of an air-conditioner-unit attachment-part structure. The specified value of the load at which the shaft portion 21a and the slit 23 accept the movement to the vehicle rearward direction of the unit case 12 is set to a value at which the unit case 12 of which the front part is pressed via the dashboard 15 is not greatly deformed. Specifically, the specified value is set such that an excess load which causes disadvantages to the PTC heater 20 (high-voltage electric component) that is accommodated inside the unit case 12 is not input by the deformation of the unit case 12.

The high-voltage electric cable 7 that is connected to the power conversion block 5 described above penetrates through the tunnel part 16a of the floor panel 16, is drawn in the air conditioner unit 11 direction, and is connected to the PTC heater 20 in the air conditioner unit 11. The electric cable 7 that is connected to the PTC heater 20 is latched and fixed via a clip 25 to an external surface of the unit case 12 at the outside of the unit case 12.

A bush 27 made of resin is attached to an insertion hole (not shown) of the floor panel 16 through which the electric cable 7 penetrates in the vertical direction. The electric cable 7 is latched and fixed to the floor panel 16 (vehicle body) via the bush 27.

The electric cable 7 has a curved or bent extra length part 28 between a latch fixation part with the unit case 12 by the clip 25 and a latch fixation part with the vehicle body by the bush 27. The length, the direction of curving or bending, and the like of the extra length part 28 are set such that a large load does not act on the vicinity of the vehicle body-side latch fixation part of the electric cable 7 when an impact load acts on the air conditioner unit 11 via the dashboard 15, and the unit case 12 is moved to the vehicle rearward direction.

Figure 6:
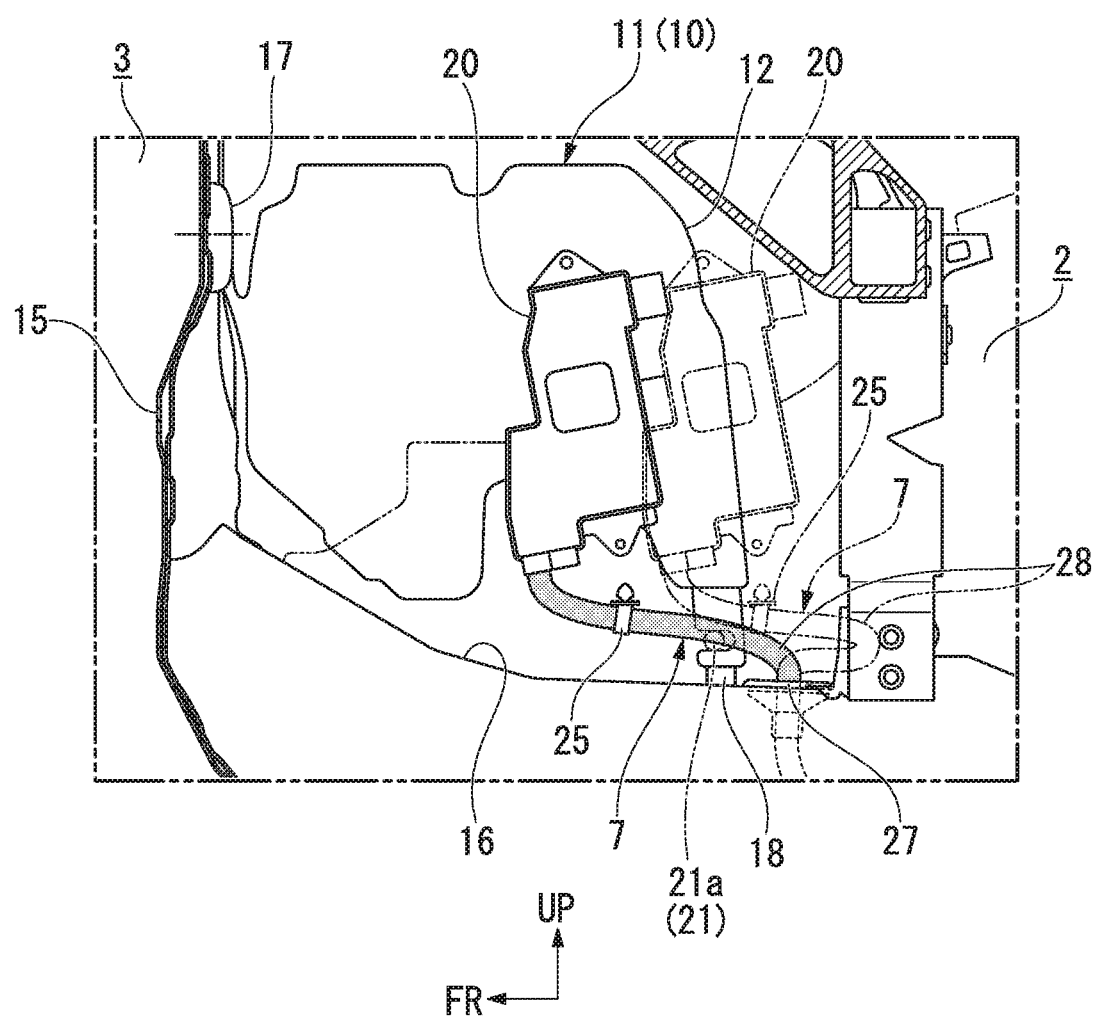
FIG. 6 is a schematic cross-sectional view along the line of FIG. 1 of the vehicle according to the embodiment of the present invention.

FIG. 6 is a view, using an imaginary line, showing a deformation behavior of each part around the air conditioner unit 11 when an impact load is input from the vehicle frontward direction.

When a large impact load is input from the frontward direction of the vehicle 1, the dashboard 15 is deformed toward the vehicle rearward direction, and the impact load is input to the unit case 12 of the air conditioner unit 11 via the dashboard 15. Then, the front part of the unit case 12 is pressed by the dashboard 15 in the vehicle rearward direction, and the latch block 24 at the rear lower end of the unit case 12 is pressed in the vehicle rearward direction with respect to the shaft portion 21a of the stud bolt 21. In this way, the deformation of the dashboard 15 is advanced, and the shaft portion 21a of the stud bolt 21 is relatively displaced in the frontward direction in the slit 23 of the latch block 24 of the unit case 12. As a result, the unit case 12 and the air conditioner component such as the PTC heater 20 inside the unit case 12 are displaced to the vehicle rearward direction as shown in FIG. 6, and a large load does not act on the PTC heater 20 and the like inside the unit case 12.

Further, at this time, the high-voltage electric cable 7 that is connected to the PTC heater 20 is greatly bent at the extra length part 28, and it is avoided that a large load acts on the vicinity of the vehicle body-side latch fixation part (bush 27).

As described above, in the vehicle air-conditioner-unit attachment-part structure according to the present embodiment, when a large impact load is input to the unit case 12 via the dashboard 15 from the vehicle frontward direction, a movement to the vehicle rearward direction of the unit case 12 is accepted at between the shaft portion 21*a* of the stud bolt 21 on the vehicle body side and the slit 23 on the air conditioner unit 11 side. Therefore, when a large impact load is input to the unit case 12 via the dashboard 15 from the vehicle frontward direction, a large deformation load does not act on the unit case 12.

Accordingly, when employing the vehicle air-conditioner-unit attachment-part structure according to the present embodiment, it is possible to effectively protect the high-voltage electric component such as the PTC heater 20 that is accommodated in the unit case 12.

Specifically, in the vehicle air-conditioner-unit attachment-part structure according to the present embodiment, the shaft portion 21*a* of the stud bolt 21 on the vehicle body side is inserted in the slit 23 of the latch block 24 on the air conditioner unit 11 side, the shaft portion 21*a* is fastened and fixed to the edge portion of the slit 23 in a state where the shaft portion 21*a* is inserted in the slit 23, and the shaft portion 21*a* on the vehicle body side and the slit 23 on the air conditioner unit 11 side constitute the displacement acceptance part that accepts a movement to the vehicle rearward direction of the unit case 12. Therefore, the unit case 12 is moved to the vehicle rearward direction such that the shaft portion 21*a* is guided by the slit 23 when an impact load is input to the unit case 12.

Accordingly, when employing the vehicle air-conditioner-unit attachment-part structure according to the present embodiment, it is possible to make the backward-moving behavior of the unit case 12 stable, and it is possible to constitute the displacement acceptance part by a simple configuration.

Further, in the case of the vehicle air-conditioner-unit attachment-part structure according to the present embodiment, the front part of the unit case 12 is fixed also to the dashboard 15 via the attachment bracket 17, and therefore, it is possible to stably support the unit case 12 by the vehicle body without increasing the number of arrangement positions of the displacement acceptance part (the shaft portion 21*a*, and the slit 23).

Accordingly, when employing the vehicle air-conditioner-unit attachment-part structure according to the present embodiment, it is possible to obtain a stable support of the air conditioner unit 11 in an ordinary use and a reliable backward displacement of the unit case 12 when an impact load is input.

Further, in the vehicle air-conditioner-unit attachment-part structure according to the present embodiment, the front part of the unit case 12 is butted and fixed to the rear surface of the dashboard 15, the fixation part on the air conditioner unit 11 side has the slit 23 substantially along the vehicle front-to-rear direction and that opens in the vehicle frontward direction, the vehicle body-side fixed part has the shaft portion 21*a* that is inserted in the slit 23, the shaft portion 21*a* is fastened and fixed to the edge portion of the slit 23 in a state where the shaft portion 21*a* is inserted in the slit 23, and the shaft portion 21*a* and the slit 23 constitute the displacement acceptance part. Therefore, when the air conditioner unit 11 is attached to the vehicle body, by moving the unit case 12 from the vehicle rearward direction to the frontward direction with respect to the shaft portion 21*a* on the vehicle body side and the dashboard 15, it is possible to easily attach the air conditioner unit 11 to the vehicle body without causing an interference between the unit case 12 and another member.

Further, in the vehicle air-conditioner-unit attachment-part structure according to the present embodiment, the high-voltage electric cable 7 that is connected to the air conditioner unit 11 is latched and fixed to the unit case 12 via the clip 25 and is latched and fixed to the vehicle body at a position apart from the unit case 12 via the bush 27, and the curved or bent extra length part 28 is provided between the latch fixation part with respect to the unit case 12 and the latch fixation part with respect to the vehicle body of the electric cable 7. Therefore, when an impact load is input to the unit case 12 via the dashboard 15 from the vehicle frontward direction, and the unit case 12 is moved in the vehicle rearward direction, the electric cable 7 is bent centering the extra length part 28, and it is possible to prevent a large load from rapidly acting on the latch fixation part with respect to the vehicle body.

Accordingly, when employing the vehicle air-conditioner-unit attachment-part structure according to the present embodiment, it is possible to effectively protect not only the high-voltage electric component such as the PTC heater 20 but also the high-voltage electric cable 7.

The invention is not limited to the embodiment described above, and a variety of design changes can be made without departing from the scope of the invention. For example, in the embodiment described above, the PTC heater 20 constitutes the high-voltage electric component that is accommodated in the unit case 12; however, the high-voltage electric component that is accommodated in the unit case 12 is not limited to the PTC heater 20.

Further, in the embodiment described above, the slit 23 is formed on the latch block 24 (air conditioner unit-side fixation part) of the unit case 12, and the shaft portion 21*a* that is inserted in the slit 23 is provided on the vehicle body side; however, conversely, the slit may be provided on the vehicle body side, and the shaft portion may be provided on the unit case side.

What is claimed is:

1. A vehicle air-conditioner-unit attachment-part structure which is an attachment part structure of an air conditioner unit of a vehicle, in which:

an air conditioner unit includes a plurality of air conditioner components that includes an electric component and a unit case that accommodates the plurality of air conditioner components;

an occupant room of the vehicle and a power installation room in front of the occupant room are partitioned by a dashboard;

the air conditioner unit is arranged to face a rear surface of the dashboard and on the occupant room side; and an air conditioner unit-side fixation part that is provided on the unit case is attached to a vehicle body-side fixed part that is provided on a vehicle body at a more vehicle rearward position than the dashboard, wherein the vehicle air-conditioner-unit attachment-part structure comprises a displacement acceptance part that allows a movement of the unit case in a vehicle rearward direction relative to the vehicle body-side fixed part upon input of an impact load to the unit case via the dashboard from a vehicle frontward direction, the vehicle body-side fixed part includes a support bracket and either one of a slit and a shaft portion, the slit along a vehicle front-to-rear direction, the shaft portion extending in a direction which is orthogonal to an extension direction of the slit, the one provided on the support bracket, the air conditioner unit-side fixation part includes a latch block and the other of the slit and the shaft, the other provided on the latch block, the shaft portion is fastened and fixed to an edge portion of the slit in a state where the shaft portion is inserted in the slit, and the shaft portion and the slit constitute the displacement acceptance part.

2. The vehicle air-conditioner-unit attachment-part structure according to claim 1, wherein a front part of the unit case is fixed to the dashboard.

3. The vehicle air-conditioner-unit attachment-part structure according to claim 1, wherein a front part of the unit case is butted and fixed to the rear surface of the dashboard, the air conditioner unit-side fixation part has the slit along the vehicle front-to-rear direction and that opens in the vehicle frontward direction, and the vehicle body-side fixed part has the shaft portion that extends in the direction which is orthogonal to the extension direction of the slit and that is inserted in the slit.

4. The vehicle air-conditioner-unit attachment-part structure according to claim 1, wherein the air conditioner unit has an electric cable that extends outside, the electric cable is latched and fixed to the unit case and is latched and fixed to the vehicle body at a position apart from the unit case, and the electric cable that is latched and fixed to the unit case and the vehicle body has a curved or bent extra length part between a latch fixation part with respect to the unit case and a latch fixation part with respect to the vehicle body.

5. The vehicle air-conditioner-unit attachment-part structure according to claim 2, wherein the air conditioner unit has an electric cable that extends outside, the electric cable is latched and fixed to the unit case and is latched and fixed to the vehicle body at a position apart from the unit case, and the electric cable that is latched and fixed to the unit case and the vehicle body has a curved or bent extra length part between a latch fixation part with respect to the unit case and a latch fixation part with respect to the vehicle body.

6. The vehicle air-conditioner-unit attachment-part structure according to claim 3, wherein the air conditioner unit has an electric cable that extends outside, the electric cable is latched and fixed to the unit case and is latched and fixed to the vehicle body at a position apart from the unit case, and the electric cable that is latched and fixed to the unit case and the vehicle body has a curved or bent extra length part between a latch fixation part with respect to the unit case and a latch fixation part with respect to the vehicle body.

7. The vehicle air-conditioner-unit attachment-part structure according to claim 1, wherein the electric component includes a heater.

8. The vehicle air-conditioner-unit attachment-part structure according to claim 7, wherein the heater includes a PTC heater.

* * * * *